A. TSCHERNE.
APPARATUS FOR CUTTING THE WASTE FROM EMBROIDERIES.
APPLICATION FILED MAR. 9, 1911.
1,022,610. Patented Apr. 9, 1912.
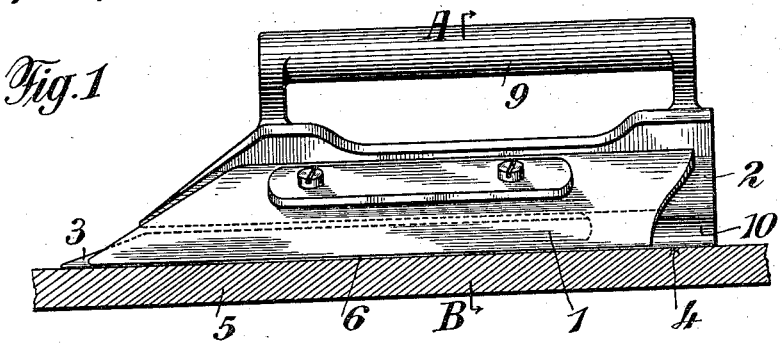
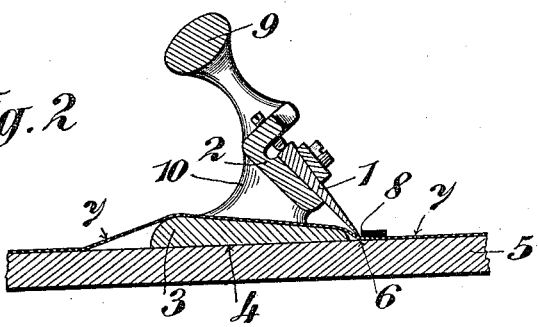
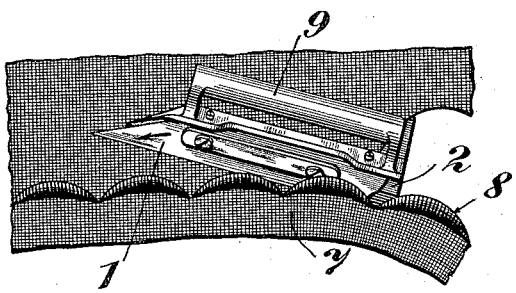
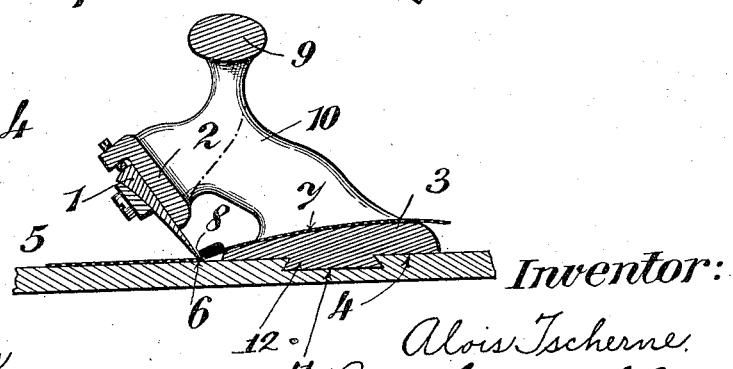
Witnesses:
B. Rommers
Elizabeth Leckert
Inventor:
Alois Tscherne
By Henry __ Atty.
COLUMBIA PLANOGRAPH CO., WASHINGTON, D. C.

UNITED STATES PATENT OFFICE.

ALOIS TSCHERNE, OF RORSCHACH, SWITZERLAND, ASSIGNOR TO THE FIRM OF HENRI LEVY, OF RORSCHACH, SWITZERLAND.

APPARATUS FOR CUTTING THE WASTE FROM EMBROIDERIES.

1,022,610.

Specification of Letters Patent.

Patented Apr. 9, 1912.

Application filed March 9, 1911. Serial No. 613,243.

*To all whom it may concern:*

Be it known that I, ALOIS TSCHERNE, a subject of the Emperor of Austria-Hungary, residing at Rorschach, Hafenplatz, Switzerland, have invented certain new and useful Improvements in Apparatus for Cutting the Waste from Embroideries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for cutting embroidered fabric along the edge of the embroidery.

The apparatus comprises a cutting blade fixed in a holder and a counter-die which is not rigidly connected to the cutting blade and together with it forms a slot which allows only the embroidered fabric to pass.

In the drawings an example of the apparatus forming the subject matter of this invention is shown.

Figure 1 is an elevation of one form of the apparatus, Fig. 2 is a section on line A—B of Fig. 1, Fig. 3 illustrates the operation of this apparatus, Fig. 4 is a cross section of a modified form of the apparatus.

The first form of the apparatus has a knife 1 which is adjustable on a part 2 of a bracket 10. A foot 3 is rigidly connected with part 2 which is adapted to slide on a plate 5 with its broad surface 4. The knife 1 and plate 5 which serves as counterdie are at an angle to each other. The knife 1 forms a slot 6 with the surface of plate 5 (Fig. 2) which allows the fabric 7 to pass but retains the embroidery.

9 is a handle.

The fabric 7 is, preferably under tension, placed on plate 5 as shown. When the cutter is displaced relatively to the material, for example, when the cutter travels in the direction of the arrow (Fig. 3) over the stationary plate 5, the fabric is separated along the edge of the embroidery. Plate 5 might be replaced by a ruler, a table or the like. The cutter may be operated by hand or mechanically and the plate 5 may as shown in Fig. 4 have a dovetailed groove 11 in which the foot 3 is slidable by means of a dovetailed rib 12 formed on the foot.

In the modified construction of Fig. 4 the knife 1 is at an obtuse angle to the guiding surface 4 while in the first form it is at an acute angle to it.

I claim:

1. An apparatus for cutting embroidery along the embroidered edge, comprising a plate, a holder slidably mounted on the plate, a knife mounted in the holder, the edge of said knife forming with the plate a slot which permits only the passage of the unembroidered part of the fabric.

2. An apparatus for cutting embroidery along the embroidered edge, comprising a plate, a holder slidably mounted on the plate, a knife mounted in the holder, the edge of said knife being parallel to the plate, and forming therewith a slot which permits only the passage of the unembroidered part of the fabric.

3. An apparatus for cutting embroidery along the embroidered edge, comprising a plate, a holder slidably mounted on the plate, a knife blade mounted in the holder at an acute angle to the plate, the edge of said knife being parallel to the plate and forming therewith a slot which only permits the passage of the unembroidered part of the fabric.

4. An apparatus for cutting embroidery along the embroidered edge, comprising a plate, a movable holder having a broad foot resting on the plate, a knife blade mounted in the holder at an acute angle to the plate, the edge of said knife being parallel to the plate and forming therewith a slot which only permits the passage of the unembroidered part of the fabric.

5. An apparatus for cutting embroidery along the embroidered edge, comprising a plate having a groove therein, a movable holder having a broad foot resting on the plate and a rib taking into the groove, a knife blade mounted on the holder at an acute angle to the plate, the edge of said knife being parallel to the plate and forming therewith a slot which only permits the
5 passage of the unembroidered part of the fabric.

In testimony that I claim the foregoing as my invention, I have signed my name in presence of two subscribing witnesses.

ALOIS TSCHERNE.

Witnesses:
ALBERT PHILLIPS,
RANDALL ATKINSON.